United States Patent
Xu et al.

(10) Patent No.: US 12,233,397 B2
(45) Date of Patent: Feb. 25, 2025

(54) COMPOSITE MATERIAL AND USE THEREOF IN DESULFURIZATION

(71) Applicants: CHINA PETROLEUM & CHEMICAL CORPORATION, Beijing (CN); SINOPEC QILU COMPANY, Shandong (CN)

(72) Inventors: Cuicui Xu, Shandong (CN); Aihua Liu, Shandong (CN); Feng Han, Shandong (CN); Jianli Liu, Shandong (CN); Zengrang Liu, Shandong (CN); Weidong Tao, Shandong (CN); Wenzhi Chang, Shandong (CN); Caishan Lyu, Shandong (CN)

(73) Assignees: CHINA PETROLEUM & CHEMICAL CORPORATION, Beijing (CN); SINOPEC QILU COMPANY, Shandong (CN)

( * ) Notice: Subject to any disclaimer, the term of this patent is extended or adjusted under 35 U.S.C. 154(b) by 520 days.

(21) Appl. No.: 17/768,108

(22) PCT Filed: Jul. 24, 2020

(86) PCT No.: PCT/CN2020/104502
§ 371 (c)(1),
(2) Date: Apr. 11, 2022

(87) PCT Pub. No.: WO2021/068599
PCT Pub. Date: Apr. 15, 2021

(65) Prior Publication Data
US 2023/0149892 A1    May 18, 2023

(30) Foreign Application Priority Data

Oct. 11, 2019    (CN) .................. 201910962508.2

(51) Int. Cl.
*B01J 20/10* (2006.01)
*B01D 53/04* (2006.01)
*B01D 53/50* (2006.01)
*B01D 53/75* (2006.01)
*B01D 53/82* (2006.01)
*B01D 53/96* (2006.01)
*B01J 20/04* (2006.01)
*B01J 20/20* (2006.01)
*B01J 20/28* (2006.01)
*C01B 17/16* (2006.01)
*C01B 17/50* (2006.01)

(52) U.S. Cl.
CPC .......... *B01J 20/20* (2013.01); *B01D 53/0423* (2013.01); *B01D 53/508* (2013.01); *B01D 53/75* (2013.01); *B01D 53/82* (2013.01); *B01D 53/96* (2013.01); *B01J 20/041* (2013.01); *B01J 20/103* (2013.01); *B01J 20/28064* (2013.01); *B01J 20/28071* (2013.01); *B01J 20/2808* (2013.01); *B01J 20/28083* (2013.01); *B01J 20/28092* (2013.01); *C01B 17/164* (2013.01); *C01B 17/508* (2013.01); *B01D 2253/102* (2013.01); *B01D 2253/106* (2013.01); *B01D 2253/1124* (2013.01); *B01D 2253/25* (2013.01); *B01D 2253/308* (2013.01); *B01D 2253/31* (2013.01); *B01D 2253/311* (2013.01); *B01D 2257/302* (2013.01); *B01D 2259/4009* (2013.01)

(58) Field of Classification Search
CPC ........ B01J 20/20; B01J 20/041; B01J 20/103; B01J 20/28064; B01J 20/28071; B01J 20/2808; B01J 20/28083; B01J 20/28092; B01D 53/0423; B01D 53/508; B01D 53/75; B01D 53/82; B01D 53/96; C01B 17/164; C01B 17/508
See application file for complete search history.

(56) References Cited

U.S. PATENT DOCUMENTS 5,059,406 A    10/1991    Sheth et al.
2005/0020445 A1    1/2005    Choudhary et al.

FOREIGN PATENT DOCUMENTS

| CN | 1324686 | A | 12/2001 | |
| CN | 1765489 | A | 5/2006 | |
| CN | 1951541 | A | 4/2007 | |
| CN | 101954284 | A | 1/2011 | |
| CN | 102059094 | A | 5/2011 | |
| CN | 102380311 | A | 3/2012 | |
| CN | 102389789 | A | 3/2012 | |
| CN | 104190352 | A | 12/2014 | |
| CN | 104190432 | A | * 12/2014 | ............. B01D 53/86 |
| CN | 109718758 | A | 5/2019 | |
| CN | 110155953 | A | 8/2019 | |

(Continued)

OTHER PUBLICATIONS

Zuo, Yanran et al., "Metal-Modified Active Coke for Simultaneous Removal of SO2 and NOx from Sintering Flue Gas"; Energy & Fuels; Dec. 2, 2014; vol. 29; pp. 377-383.

(Continued)

*Primary Examiner* — Yong L Chu
(74) *Attorney, Agent, or Firm* — NKL Law; Allen Xue (57) ABSTRACT

A composite material is used for desulfurization. The composite material contains activated carbon, alkali metal oxides, silicon oxides, iron oxides, and rare earth element oxides. The weight ratio among the activated carbon, iron oxides and rare earth element oxides is 100:(0.5-5):(1-10). The composite material, used as a sulfur adsorbent, has a higher sulfur breakthrough capacity and desulfurization rate.

15 Claims, 2 Drawing Sheets

(56) References Cited

FOREIGN PATENT DOCUMENTS

JP         3843141 B2   11/2006
WO   2007072440 A2   6/2007

OTHER PUBLICATIONS

Zhang, Lei et al., "Performance of metal supported catalysts on flue gas desulphurization"; Environmental Pollution & Control; May 2013; vol. 35, No. 5; pp. 68-71.
Luo, Xin et al.; "Air Pollution Control Engineering"; Tianjin Science and Technology Press, Jun. 30, 2018; p. 218.
Zhu, Hongfa et al.; "A Handbook of Catalysts"; Jindun Press, Aug. 2008, pp. 549-552, ISBN 978-7-5082-5148-6.
Chinese Patent Office, First Office Action of priority application CN 201910962508.2, Aug. 5, 2021.

* cited by examiner

COMPOSITE MATERIAL AND USE THEREOF IN DESULFURIZATION

TECHNICAL FIELD

The present disclosure relates to the technical field of desulfurization, in particular to a composite material and use thereof in desulfurization.

BACKGROUND $SO_2$ is the primary cause of acid rain; it can destroy the physiological function of plants, and slow down growth of crops and trees; when the human body inhales $SO_2$ gas with a high concentration, which can impose a strong irritating effect on the respiratory tract of human. $SO_2$ is regarded as the major pollutant in the atmosphere and has attracted wide attention of the populace. For example, $SO_2$ emissions have been reported to cause 40% of the domestic land area in China to be harmed by acid rain, the annual economic loss reaches up to 110 billion yuan. Therefore, controlling pollution and reducing $SO_2$ emissions are important tasks to perform the sustainable economic and social development of China.

$SO_2$-containing exhaust gas will be generated in the exhaust gas of industrial heating furnaces, sulfur tail gas and catalytic cracking regenerative flue gas. Given that the environmental protection regulations in China are increasingly stringent, the task of reducing $SO_2$ emission is extremely urgent. At present, the flue gas desulfurization technologies at home and abroad are divided into two major categories. The first category is a wet process, i.e., the exhaust gas is treated with some kind of liquid absorbent, emulsion absorbent or absorption solution; the second category is a dry process, i.e., the $SO_2$ in the flue gas is removed by a sorbent, an absorbent or a catalyst in powder or granular form. The most representative and fastest growing technique of the wet process desulfurization technologies is alkaline washing desulfurization, such as the LABSORB™ technology commercially available from the DuPont™ BELCO Corporation. A lower emission of 50 mg/m³ or less is achieved by the wet process desulfurization technology which subjects the flue gas to the alkaline washing, but the process brings about the new secondary pollutants, namely sodium sulfate-containing waste water, which is forbidden by the law and regulations to be directly discharged and its retreatment process requires a large amount of investment. The China Petroleum & Chemical Corporation (Sinopec) has completely banned the newly implemented the alkaline process desulfurization on the fume gas emitted by a variety of facilities. The dry process desulfurization has been gaining momentum in recent years due to its characteristics of simple operation, small investment on equipment, and not causing secondary pollution, and is regarded as the most promising desulfurization technology with vast application prospect. The research and development of dry process flue gas desulfurization technologies have attracted widespread attention at home and abroad in recent years. If a mature technology of dry process desulfurization can be used for removing sulfur dioxide in the flue gas, it would be desirable to meet requirements of the environmental protection regulations and safeguard the atmospheric environment while reducing the emission amount of $SO_2$.

The core of the dry process desulfurization technology is the adsorbent. The molecular sieves and activated carbons are the key adsorbents used for the dry process adsorption desulfurization. Activated carbons are charcoals having strong adsorption capability, which are prepared by using coal, wood, fruit husks and the like as the raw materials, and subjecting to high temperature (300-400° C.) carbonization, anoxic activation (920-960° C.) and post-treatment. The specific features of hydrophobic, non-polar and thermally stable performance of the activated carbons per se enable them to be easily modified and activated during use, and the activated carbons have unique surface chemical property and void volume structure, which enhances their loading capacity and adsorptive property. Activated carbons have well-developed internal porosity, the adsorbable micro-pore surface area accounts for more than 95% of the total surface area, the activated carbon with a tremendous specific surface area can effectively adsorb sulfur-containing compounds such as $SO_2$. The adsorption of $SO_2$ by activated carbons is affected by the surface properties such as morphology, distribution of the pore size. The ordinary activated carbons have a small capacity of sulfur adsorption, a low desulfurization rate and a poor accuracy, they are usually modified to achieve more desirable desulfurization effects. Modifying the chemical property of the activated carbon surface to increase its adsorption rate and sulfur capacity is currently the main direction of research and development of the desulfurization with activated carbons.

CN102059094A discloses a preparation method of sulfur-removal activated carbon containing copper, the method relates to the technical field of removing the sulfur-containing compounds in the air, and intends to solve the problems of low desulfurization efficiency and high production cost of the traditional sulfur-removal activated carbon. The present disclosure provides a sorbent for simulating industrial flue gas desulfurization with a mixed gas of high purity $SO_2$, $H_2S$, air and water vapor. CN101954284A discloses an activated carbon desulfurization catalyst and a preparation method thereof. The provided catalyst is consisting of carrier activated carbon and an active ingredient metal oxide mixture, wherein the metal oxide mixture is the mixture of copper oxide, iron oxide, aluminum oxide, nickel oxide, manganese oxide, cobalt oxide and zinc oxide.

Although the aforementioned literatures have reported some sorbents for removing the sulfur-containing compounds and the corresponding desulfurization process, there are problems with low sulfur removal rates (the saturated sulfur capacity is typically within the range of 5-10%) and low sulfur breakthrough capacity of the desulfurizing agent during the practical applications. The limited adsorption capacity causes a large dosage of sorbents and the bulky purification plant, increases the capital cost of the equipment, and the frequent regeneration complicates the operation process.

SUMMARY

The object of the present disclosure is to overcome the problems in the prior art that a combination of desulfurization rate and sulfur breakthrough capacity cannot be obtained simultaneously, and provide a composite material and its use in desulfurization.

The inventors of the present disclosure have discovered that the activated carbon composite material, prepared by selecting the specific elements and blending and kneading the raw materials with a specific proportion and calcinating the mixture, can significantly improve the desulfurization rate and sulfur breakthrough capacity of the composite material. Therefore, in order to achieve the above objects, a first aspect of the present disclosure provides a composite material, comprising activated carbon, alkali metal oxides, silicon oxides, iron oxides, and rare earth element oxides, wherein the weight ratio between the activated carbon, iron oxides and rare earth element oxides is 100:(0.5-5):(1-10), and the composite material satisfies the following formula I:

$$\frac{M_1}{30(M_3 + M_4 + 3 \times M_5)} \leq M_2 \leq \frac{1.5 \times M_3}{M_4} \quad \text{formula I}$$

in formula I:
$M_1$ represents the weight content of activated carbon in the composite material;
$M_2$ represents the weight content of alkali metal oxides in the composite material;
$M_3$ represents the weight content of silicon oxides in the composite material;
$M_4$ represents the weight content of iron oxides in the composite material;
$M_5$ represents the weight content of oxides of rare earth elements other than cerium in the composite material.

A second aspect of the present disclosure provides a method of preparing a composite material, the method comprises the following steps:
(1) Blending, kneading, molding, drying, and calcinating activated carbon, alkali metal precursor, silicon-containing binder, and optional pore-enlarging agent in the presence of a solvent to obtain the modified activated carbon;
(2) Contacting a precursor of an auxiliary agent with the modified activated carbon to load the modified activated carbon with the auxiliary agent, wherein the precursor of the auxiliary agent comprises a precursor of iron and a precursor of a rare earth element, an used amount of the precursor of the auxiliary agent causes that a weight ratio of activated carbon, iron element and rare earth element in the composite material is 100:(0.5-5):(1-10);

Wherein the used amounts of the precursor of the alkali metal and the silicon-containing binder enable that the weight content of the activated carbon, alkali metal element, silicon element, iron element and rare earth element in the composite material satisfies Formula I, and the weights of the alkali metal element, silicon element, iron element and rare earth element are based on the oxides.

A third aspect of the present disclosure provides an use of the aforementioned composite material in adsorption desulfurization.

A fourth aspect of the present disclosure provides a system with a desulfurization function, the system comprises:
an oxidation unit for treating sulfur-containing gas and recovering sulfur;
a hydrogenation purification unit, which is connected with the oxidation unit for subjecting the oxidation tail gas from the oxidation unit to hydrogenation reduction and recovering hydrogen sulfide in the reduced product obtained from the hydrogenation reduction;
an incineration unit for incinerating the purified tail gas discharged from the hydrogenation purification unit;
an adsorption unit for adsorbing $SO_2$ from the $SO_2$-containing flue gas obtained by incineration, wherein the adsorbent used in the adsorption unit is the aforementioned composite material.

A fifth aspect of the present disclosure provides a method for desulfurization, the method comprises the following steps:

(a) oxidizing the sulfur-containing gas to be treated and recovering the sulfur;
(b) subjecting the oxidized tail gas to hydrogenation reduction and recovering hydrogen sulfide from the reduction product obtained from the hydrogenation reduction;
(c) incinerating the tail gas obtained after the hydrogenation reduction;
(d) contacting the incinerated $SO_2$-containing flue gas with a sorbent to adsorb $SO_2$, the sorbent is the aforementioned composite material.

The advantages of the present disclosure over the prior art are as follows:
(1) The composite material prepared with the modified activated carbon of the present disclosure has a high saturated sulfur capacity and sulfur breakthrough capacity when the composite material is used as an adsorbent. The composite material has a specific surface area more than 550 $m^2/g$ and a pore volume more than 0.35 ml/g, which ensures that the composite material has desirable adsorbability, and a saturated sulfur capacity equal to or greater than 15%, a sulfur capacity (sulfur breakthrough capacity) more than 12% when the removal rate of $SO_2$ is lowered to 99%, and a long total time used for reaching the sulfur breakthrough capacity.
(2) The composite prepared with the modified activated carbon of the present disclosure has desired regeneration properties.
(3) The composite prepared with the modified activated carbon of the present disclosure has a simple preparation process, and the preparation process does not bring about the secondary pollution.
(4) The composite prepared with the modified activated carbon of the present disclosure can promote development of the dry process desulfurization techniques, and provide a clean, secondary pollution-free, environmentally friendly process for the treatment of sulfur-containing waste gas.

DESCRIPTION OF REFERENCE SIGNS

11 Thermal reaction furnace
12 First stage condenser
13 Primary catalytic converter
14 Second stage condenser
15 Secondary catalytic converter
16 Third stage condenser
17 Liquid sulfur pool
21 Hydrogenation reactor
22 Hydrogenation tail gas cooler
23 Quench tower
24 Absorption tower
31 Incineration unit
41 First absorption tower
42 Second absorption tower
111 Tail gas reheater
222 Flue gas heat exchanger

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

Unless otherwise specified in the present disclosure, the volume of gas is expressed with the volume under the standard temperature and pressure (STP, i.e., under the temperature of 0° C. or 273K and a pressure of $1.01 \times 10^5$ Pa); the term "silicon-aluminum ratio" means the molar ratio between the silicon element and the aluminum element; the term "ppm or parts per million" is the unit of volume concentration; the pressure refers to the gauge pressure. The term "saturated sulfur capacity" means the maximum amount of sulfur that can be absorbed per unit weight of the desulfurizing agent, that is, the fresh adsorbent is continuously contacted with the sulfur-containing gas, the saturated sulfur capacity is exactly the weight percentage of the sulfur content adsorbed by the adsorbent relative to the adsorbent when the sulfur content of the sulfur-containing gas before the contact with the adsorbent is equal to the sulfur content of the sulfur-containing gas after the contact with the adsorbent. The term "sulfur breakthrough capacity" refers to the weight percentage of sulfur that can be absorbed by the adsorbent when the process purge degree index (removal rate is reduced to 99%) is ensured under the conditions consisting of a gas volume hourly space velocity of 1,750 $h^{-1}$ and a reaction temperature of 120° C.

The present disclosure provides a modified activated carbon, it is characterized in that the modified activated carbon comprises activated carbon, alkali metal oxides and silicon oxides, wherein a weight ratio between the activated carbon, the alkali metal oxides and the silicon oxides is 100:(0.2-3):(0.8-5).

According to the modified activated carbon of the present disclosure, the weight ratio between the activated carbon and the alkali metal oxides is preferably 100:(0.5-2), such as 100:0.5, 100:0.6, 100:1, 100:1.2, 100:1.5, 100:1.7, 100:1.8, 100:2, or any value between the above-mentioned numerical values.

According to the modified activated carbon of the present disclosure, the weight ratio between the activated carbon and the silicon oxides is preferably 100:(1-2.8), such as 100:1, 100:1.5, 100:1.6, 100:1.7, 100:2, 100:2.2, 100:2.5, 100:2.8, or any value between the above-mentioned numerical values.

According to the present disclosure, the alkali metal oxides may be oxides of the commonly used alkali metal with different valence states (e.g., lithium, sodium, potassium), especially the oxides obtained by subjecting a precursor of the commonly used alkali metal to the high temperature calcination. Preferably, the alkali metal oxides are $K_2O$ and/or $Na_2O$.

According to the present disclosure, the silicon oxides may be the oxides of the commonly used silicon with different valence states, in particular the oxides obtained by subjecting a precursor of the commonly used silicon to the high temperature calcination. Preferably, the silicon oxide is $SiO_2$.

According to preferred embodiments of the present disclosure, the modified activated carbon has a specific surface area equal to or larger than 600 $m^2/g$, more preferably of 650-750 $m^2/g$.

According to a preferred embodiment of the present disclosure, the modified activated carbon has a pore volume equal to or larger than 0.4 ml/g, more preferably 0.4-0.45 ml/g.

The present disclosure provides a method for preparing modified activated carbon, wherein the method comprises the following steps: blending and kneading, molding, drying, and calcinating activated carbon, alkali metal precursor, silicon-containing binder, and an optional pore-enlarging agent in the presence of a solvent; the used amounts of the activated carbon, the alkali metal precursor and the silicon-containing binder cause that the weight ratio between the activated carbon, the alkali metal precursor and the silicon-containing binder in the modified activated carbon is 100:(0.2-3):(0.8-5), wherein the weights of the alkali metal element and the silicon element are based on the oxides.

According to the method for preparing modified activated carbon of the present disclosure, the used amounts of the activated carbon and the alkali metal precursor cause that the weight ratio between the activated carbon and the alkali metal element in the modified activated carbon is preferably 100:(0.5-2).

According to the method for preparing modified activated carbon of the present disclosure, the used amounts of the activated carbon and the silicon-containing binder cause that the weight ratio between the activated carbon and the silicon element in the modified activated carbon is preferably 100:(1-2.8).

According to the method of preparing a modified activated carbon of the present disclosure, the activated carbon may be a variety of commonly used activated carbons, preferably the activated carbons have a specific surface area equal to or larger than 700 $m^2/g$, more preferably 700-1,000 $m^2/g$.

According to the method of preparing a modified activated carbon of the present disclosure, the alkali metal precursor is not specifically limited, the precursor may be various common alkali metal-containing water-soluble compounds, preferably, the alkali metal precursor is at least one of a bicarbonate salt of the alkali metal, a carbonate salt of the alkali metal, a nitrate salt of the alkali metal and a sulfate salt of the alkali metal, and more preferably, at least one of sodium bicarbonate, potassium bicarbonate, sodium carbonate and potassium carbonate.

The method for preparing a modified activated carbon of the present disclosure does not impose the particular requirement on the silicon-containing binder, it is preferably silica and/or silicate, more preferably silica sol and/or water glass. It is well-known among those skilled in the art that water glass generally means an aqueous solution of sodium silicate ($Na_2O \cdot nSiO_2$), thus it can provide Si as a silicon-containing binder or provide Na as a precursor for alkali metals, in this case, the total used amount of water glass and a precursor for alkali metals (sodium) enables that the content of $Na_2O$ in the prepared product is within the above-mentioned range.

According to the method for preparing modified activated carbon of the present disclosure, the pore-enlarging agent is a selectively used substance, an use of the pore-enlarging agent can further increase the specific surface area of the modified activated carbon. The used amount of the pore-enlarging agent is not particularly defined, but preferably, the weight ratio of the activated carbon to the pore-enlarging agent is 100:(1-10).

According to the method for preparing modified activated carbon of the present disclosure, the pore-enlarging agent may be a variety of existing pore-enlarging agents, preferably, the pore-enlarging agent is a decomposable substance at a temperature of not higher than 450° C. More preferably, the pore-enlarging agent is at least one of sesbania powder, polyethylene glycol, cellulose, starch and citric acid.

The method for preparing modified activated carbon of the present disclosure does not impose a special requirement on the drying mode, but for the sake of further improving the properties of the obtained modified activated carbon, the drying process is performed by a multi-stage drying method. Preferably, the drying process is performed by initially drying at 40-80° C. for 2-4 h, and then drying at 100-160° C. (preferably 110-130° C.) for 4-6 h.

The method for preparing modified activated carbon of the present disclosure does not impose special requirement on the calcination conditions, it is preferable that the calcination conditions comprise a calcination temperature within the range of 400-700° C., more preferably 450-600° C. Still preferably, the calcination conditions further comprise the calcination time within the range of 3-8 h, more preferably 4-6 h.

The method for preparing the modified activated carbon of the present disclosure does not impose a special requirement on the solvent, which may be a commonly used organic solvent and/or an inorganic solvent. However, it is preferable that the solvent is water. Those skilled in the art can control the dosage of the solvent according to the requirements of blending, kneading and molding, the relevant content will not be further described herein.

According to the method for preparing modified activated carbon of the present disclosure, the blending, kneading and molding may be performed in a conventional manner, for example, by means of a molding apparatus, such as a strip extruder.

The present disclosure also provides a modified activated carbon prepared with the aforementioned method.

According to an embodiment of the present disclosure, the present disclosure provides a composite material, wherein the composite material comprises activated carbon, alkali metal oxides, silicon oxides, iron oxides, and rare earth element oxides, wherein the weight ratio between the activated carbon, iron oxides and rare earth element oxides is 100:(0.5-5):(1-10), and the composite material satisfies the following formula I:

$$\frac{M_1}{30(M_3 + M_4 + 3 \times M_5)} \leq M_2 \leq \frac{1.5 \times M_3}{M_4} \qquad \text{formula I}$$

In formula I:
$M_1$ represents the weight content of activated carbon in the composite material;
$M_2$ represents the weight content of alkali metal oxides in the composite material;
$M_3$ represents the weight content of silicon oxides in the composite material;
$M_4$ represents the weight content of iron oxides in the composite material;
$M_5$ represents the weight content of oxides of rare earth elements other than cerium in the composite material.

In the present disclosure, the content of the alkali metal oxides is calculated based on the monovalent metal oxide; the content of the silicon oxides is calculated based on $SiO_2$; the content of the iron oxides is calculated based on $Fe_2O_3$; among the oxides of the rare earth elements, the content of the cerium oxide is based on $CeO_2$, and the content of the oxide of the rare earth elements other than cerium is calculated based on the trivalent metal oxide.

According to this embodiment of the present disclosure, the composite material may be prepared by subjecting all the precursors to blending and mixing, molding, drying and calcination. In this embodiment, the composite has a specific surface area preferably equal to or larger than 560 m²/g, more preferably within a range of 570-600 m²/g. Preferably, the composite material has a pore volume equal to or larger than 0.38 ml/g, more preferably 0.38-0.42 ml/g. Preferably, the composite material has a saturated sulfur volume equal to or larger than 15%, more preferably 18-20%. Preferably, the composite material has a sulfur breakthrough capacity equal to or larger than 12%, more preferably 12-15%. Preferably, the pore volume of the pores having a pore size below 3 nm accounts for 80% or more of the total pore volume of the composite material, more preferably, the pore volume of the pores having a pore size below 3 nm accounts for 80-88% of the total pore volume of the composite material. Preferably, the pore volume of the pores having a pore size below 1 nm accounts for 5-10% of the total pore volume of the composite material; the pore volume of the pores having a pore size within a range of 1-2 nm accounts for 40-55% of the total pore volume; the pore volume of the pores having a pore size larger than 2 nm and equal to or less than 3 nm accounts for 25-35% of the total pore volume. The pore volume of the pores having a pore size larger than 3 nm accounts for 12-20% of the total pore volume of the composite material.

According to another embodiment of the present disclosure, there is provided a composite material, it is characterized in that the composite material comprises modified activated carbon and an auxiliary agent supported on the modified activated carbon, wherein the modified activated carbon comprises activated carbon, alkali metal oxides and silicon oxides; the auxiliary agent comprises iron oxides and rare earth element oxides, a weight ratio between the activated carbon, iron oxides and rare earth element oxides is 100:(0.5-5):(1-10), and the composite material satisfies the following formula I:

$$\frac{M_1}{30(M_3 + M_4 + 3 \times M_5)} \leq M_2 \leq \frac{1.5 \times M_3}{M_4} \qquad \text{formula I}$$

In formula I:
$M_1$ represents the weight content of activated carbon in the composite material;
$M_2$ represents the weight content of alkali metal oxides in the composite material;
$M_3$ represents the weight content of silicon oxides in the composite material;
$M_4$ represents the weight content of iron oxides in the composite material;
$M_5$ represents the weight content of oxides of rare earth elements other than cerium in the composite material.

According to the embodiment of the present disclosure, the modified activated carbon may be initially prepared, the auxiliary agent is then loaded on the modified activated carbon to prepare the composite material. In this embodiment, the composite has a specific surface area preferably equal to or larger than 550 m²/g, more preferably within a range of 560-590 m²/g. Preferably, the composite material has a pore volume equal to or larger than 0.35 ml/g, more preferably 0.36-0.40 ml/g. Preferably, the composite material has a saturated sulfur volume equal to or larger than 18%, more preferably 20-25%. Preferably, the composite material has a sulfur breakthrough capacity equal to or larger than 12%, more preferably 15.5-16%. Preferably, the pore volume of the pores having a pore size below 3 nm accounts for 80% or more of the total pore volume of the composite material, more preferably, the pore volume of the pores having a pore size below 3 nm accounts for 80-88% of the total pore volume of the composite material. Preferably, the pore volume of the pores having a pore size below 1 nm accounts for 5-10% of the total pore volume of the composite material; the pore volume of the pores having a pore size within a range of 1-2 nm accounts for 40-55% of the total pore volume; the pore volume of the pores having a pore size larger than 2 nm and equal to or less than 3 nm accounts for 25-35% of the total pore volume. The pore volume of the pores having a pore size larger than 3 nm accounts for 12-20% of the total pore volume of the composite material.

According to the composite material of the present disclosure, the weight ratio between the activated carbon and the alkali metal oxides may be 100:(0.2-3), preferably 100:(0.5-2), such as 100:0.5, 100:0.6, 100:1, 100:1.2, 100:1.5, 100:1.7, 100:1.8, 100:2 or any value between the above-mentioned numerical values.

According to the composite material of the present disclosure, the weight ratio between the activated carbon and the silicon oxides may be 100:(0.8-5), preferably 100:(1-2.8), such as 100:1, 100:1.5, 100:1.6, 100:1.7, 100:2, 100:2.2, 100:2.5, 100:2.8 or any value between the above-mentioned numerical values.

According to the composite material of the present disclosure, the weight ratio between the activated carbon and the iron oxides is preferably 100:(1-2.2), such as 100:1, 100:1.5, 100:1.7, 100:2, 100:2.1, 100:2.2 or any value between the above-mentioned numerical values.

According to the composite material of the present disclosure, a weight ratio between the activated carbon and rare earth element oxides is preferably 100:(2-5), such as 100:2, 100:2.2, 100:2.5, 100:3, 100:3.5, 100:3.8, 100:4, 100:4.5, 100:5 or any value between the above-mentioned numerical values.

According to the composite material of the present disclosure, the alkali metal oxides may be oxides of the commonly used alkali metal with different valence states (e.g., lithium, sodium, potassium), especially the oxides obtained by subjecting a precursor of the commonly used alkali metal to the high temperature calcination. Preferably, the alkali metal oxides are $K_2O$ and/or $Na_2O$.

According to the composite material of the present disclosure, the silicon oxides may be the oxides of the commonly used silicon with different valence states, in particular the oxides obtained by subjecting a precursor of the commonly used silicon to the high temperature calcination. Preferably, the silicon oxide is $SiO_2$.

According to the composite material of the present disclosure, the iron oxides may be the oxides of the commonly used iron with different valence states, in particular the oxides obtained by subjecting a precursor of the commonly used iron to the high temperature calcination. Preferably, the iron oxide is $Fe_2O_3$.

According to the composite material of the present disclosure, rare earth element oxides may be oxides of the commonly used rare earth element of different valence, such as lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), yttrium (Y), and scandium (Sc), particularly the oxides obtained by subjecting a precursor of the commonly used rare earth element to the high temperature calcination. Preferably, the rare earth element oxides are $CeO_2$ and/or $La_2O_3$. Further preferably, rare earth element oxides are $CeO_2$ and $La_2O_3$, and the weight ratio of $CeO_2$ to $La_2O_3$ is within a range of 1-3. The adsorption property of the composite material can be further improved by selecting the preferred rare earth element oxides.

According to preferred embodiments of the present disclosure, the modified activated carbon has a specific surface area equal to or larger than 600 $m^2/g$, more preferably of 650-750 $m^2/g$.

According to a preferred embodiment of the present disclosure, the modified activated carbon has a pore volume equal to or larger than 0.4 ml/g, more preferably 0.4-0.45 ml/g.

According to a preferred embodiment of the present disclosure, the modified activated carbon or composite material of the present disclosure does not contain a detectable amount of Y, Cu, Al, Ni, Mn, Co, Zn, Mg, V, Zr, Ti or Mo. More preferably, the modified activated carbon or composite material of the present disclosure is only composed of the aforementioned ingredients.

According to an embodiment, the present disclosure provides a method of preparing a composite, it is characterized in that the method comprises the following steps: blending and kneading, molding, drying and calcinating the activated carbon, alkali metal precursor, silicon-containing binder, iron precursor, rare earth element precursor, and optional pore-enlarging agent in the presence of a solvent, the used amounts cause that the weight ratio of the activated carbon, the iron precursor and the rare earth element precursor is 100:(0.5-5):(1-10), wherein the used amounts of the alkali metal precursor and the silicon-containing binder cause that the weight content of the activated carbon, the alkali metal, the silicon element, the iron element and the rare earth element in the composite material satisfies formula I, wherein the weights of the alkali metal element, the silicon element, the iron element, and the rare earth element are based on the oxides thereof. In the embodiment, the drying mode is preferably carried out by initially drying at 40-80° C. for 2-4 h, and subsequently drying at 100-160° C. (more preferably 110-130° C.) for 4-6 h. Preferably, the calcination conditions comprise a calcination temperature within the range of 400-700° C., and more preferably 450-600° C. Preferably, the calcination conditions further comprise a calcination time of 3-8 h, and more preferably 4-6 h.

According to another embodiment of the present disclosure the present disclosure provides a method of preparing a composite material, it is characterized in that the method comprises the following steps:

(1) Blending and kneading, molding, drying, and calcinating activated carbon, alkali metal precursor, silicon-containing binder, and optional pore-enlarging agent in the presence of a solvent to obtain the modified activated carbon;

(2) Contacting a precursor of an auxiliary agent with the modified activated carbon to load the modified activated carbon with the auxiliary agent, wherein the precursor of the auxiliary agent comprises a precursor of iron and a precursor of a rare earth element, an used amount of the precursor of the auxiliary agent causes that a weight ratio of activated carbon, iron element and rare earth element in the composite material is 100:(0.5-5):(1-10);

Wherein the used amounts of the precursor of the alkali metal and the silicon-containing binder enable that the weight content of the activated carbon, alkali metal element, silicon element, iron element and rare earth element in the composite material satisfies Formula I, and the weights of the alkali metal element, silicon element, iron element and rare earth element are based on the oxides.

In step (1) of the embodiment, the drying mode is preferably performed by initially drying at 40-80° C. for 2-4 h, and then drying at 100-160° C. (more preferably 110-130° C.) for 4-6 h. Preferably, the calcination conditions comprise a calcination temperature within the range of 400-700° C., more preferably 450-600° C. The calcination conditions further comprise the calcination time within the range of 3-8 h, more preferably 4-6 h.

In step (2) of the embodiment, the molecular sieve composite may be loaded with an auxiliary agent by adopting the conventional method, the mode of loading the modified activated carbon with an auxiliary agent is preferably that impregnating the modified activated carbon with a solution of a precursor containing the auxiliary agent by means of an equal volume impregnation, drying the impregnated product, and calcinating the dried product.

More preferably, the conditions of equal volume impregnation comprise a temperature within the range of 5-40° C., further preferably 20-30° C. More preferably, the conditions of equal volume impregnation further comprise a time within the range of 20 min-3 h, further preferably 0.5-1 h.

More preferably, the conditions of drying the impregnated product include a temperature within the range of 80-160° C., more preferably 110-130° C. More preferably, the conditions of drying the impregnated product further comprise a time within the range of 2-10 h, more preferably 4-6 h.

More preferably, the conditions of calcinating the dried product comprise a calcination temperature within the range of 300-500° C., further preferably 350-450° C. More preferably, the conditions of calcinating the dried product further comprise a calcination time within the range of 2-10 h, further preferably 3-5 h.

According to the method of the present disclosure, the used amounts of the activated carbon and the alkali metal precursor cause that the weight ratio between the activated carbon and the alkali metal element in the composite material may be 100:(0.2-3), preferably 100:(0.5-2), such as 100:0.5, 100:0.6, 100:1, 100:1.2, 100:1.5, 100:1.7, 100:1.8, 100:2 or any value between the above-mentioned numerical values.

According to the method of the present disclosure, the used amounts of the activated carbon and the silicon-containing binder cause that the weight ratio between the activated carbon and the silicon element in the composite material can be 100:(0.8-5), preferably 100:(1-2.8), such as 100:1, 100:1.5, 100:1.6, 100:1.7, 100:2, 100:2.2, 100:2.5, 100:2.8 or any value between the above-mentioned numerical values.

According to the method of the present disclosure, the used amounts of the activated carbon and the iron precursor cause that the weight ratio between the activated carbon and the iron element in the composite material is preferably 100:(1-2.2), such as 100:1, 100:1.5, 100:1.7, 100:2, 100:2.1, 100:2.2, or any value between the above-mentioned numerical values.

According to the method of the present disclosure, the used amounts of the activated carbon and the rare earth element precursor cause that the weight ratio between the activated carbon and the rare earth element in the composite material is preferably 100:(2-5), such as 100:2, 100:2.2, 100:2.5, 100:3, 100:3.5, 100:3.8, 100:4, 100:4.5, 100:5, or any value between the above-mentioned numerical values.

According to the method of preparing a composite material of the present disclosure, the activated carbon may be a variety of commonly used activated carbons, preferably the activated carbons have a specific surface area equal to or larger than 700 m$^2$/g, more preferably 700-1,000 m$^2$/g.

The method for preparing a composite material of the present disclosure does not impose special limitation to the alkali metal precursor, the precursor may be various common alkali metal-containing water-soluble compounds, preferably, the alkali metal precursor is at least one of a bicarbonate of the alkali metal, a carbonate of the alkali metal, a nitrate of the alkali metal and a sulfate of the alkali metal, and more preferably, at least one of sodium bicarbonate, potassium bicarbonate, sodium carbonate and potassium carbonate.

The method for preparing a composite material of the present disclosure does not impose the particular requirement on the silicon-containing binder, it is preferably silica and/or silicate, more preferably silica sol and/or water glass. It is well-known among those skilled in the art that water glass generally means an aqueous solution of sodium silicate ($Na_2O \cdot nSiO_2$), thus it can provide Si as a silicon-containing binder or provide Na as a precursor for alkali metals, in this case, the total used amount of water glass and a precursor for alkali metals (sodium) enables that the content of $Na_2O$ in the prepared product is within the above-mentioned range.

According to the method for preparing a composite material of the present disclosure, the pore-enlarging agent is a selectively used substance, an use of the pore-enlarging agent can further increase the specific surface area of the modified activated carbon. The used amount of the pore-enlarging agent is not particularly defined, but preferably, the weight ratio of the activated carbon to the pore-enlarging agent is 100:(1-10).

According to the method for preparing a composite material of the present disclosure, the pore-enlarging agent may be a variety of existing pore-enlarging agents, preferably, the pore-enlarging agent is a decomposable substance at a temperature of not higher than 450° C. More preferably, the pore-enlarging agent is at least one of sesbania powder, polyethylene glycol, cellulose, starch and citric acid.

According to the method of preparing a composite material of the present disclosure, the iron precursor may be a variety of commonly used iron-containing water-soluble compounds. Preferably, the iron precursor is a soluble iron salt, preferably ferric nitrate and/or ferric chloride.

According to the method of preparing a composite material of the present disclosure, the rare earth element precursor may be a variety of the existing water-soluble compounds containing a rare earth element, preferably, the rare earth element precursor is a soluble salt of a rare earth metal, more preferably a nitrate of a rare earth metal and/or a chloride of a rare earth metal.

Further preferably, the rare earth element precursor comprises a precursor of cerium and a precursor of lanthanum, and the used amounts of the precursor of cerium and the precursor of lanthanum cause that the weight ratio of the cerium element to the lanthanum element in the composite material is within a range of 1-3. As previously mentioned, the precursor of cerium is preferably cerium nitrate and/or cerium chloride; the precursor of lanthanum is preferably lanthanum nitrate and/or lanthanum chloride.

The method of preparing a composite material of the present disclosure does not impose a special requirement on the solvent, which may be a commonly used organic solvent and/or an inorganic solvent. However, it is preferable that the solvent is water. Those skilled in the art can control the dosage of the solvent according to the requirements of blending, kneading and molding, the relevant content will not be further described herein.

According to the method of preparing a composite material of the present disclosure, the blending, kneading and molding may be performed in a conventional manner, for example, by means of a molding apparatus, such as a strip extruder.

The present disclosure also provides a composite prepared with the aforementioned method.

The present disclosure further provides an use of the aforementioned modified activated carbon or composite material in adsorption desulfurization, particularly in adsorption desulfurization of the samples having a low sulfur content, such as the gas samples having a sulfur dioxide content no more than 0.2 vol. % (i.e., 6,000 mg/m$^3$), e.g., the flue gas.

The present disclosure further provides a desulfurization method, the method comprises: contacting the sulfur-containing gas to be treated with the aforementioned composite material;

Alternatively, the method comprises: preparing a composite material according to the aforementioned method; then contacting the sulfur-containing gas with the produced composite material.

The desulfurization method according to the present disclosure is particularly suitable for removal of sulfur contained in samples having a relatively low sulfur content, therefore, the sulfur dioxide content of the sulfur-containing gas is preferably not greater than 0.2 vol. %. On the other hand, when the sulfur dioxide content of the sulfur-containing gas is greater than 0.2 vol. %, the method preferably further comprises a step of reducing the sulfur dioxide content of the sulfur-containing gas to below 0.2 vol. % prior to contacting it with the composite material.

The desulfurization method of the present disclosure does not impose the special requirements on the contacting conditions, but the contacting conditions preferably include a temperature of 100-150° C. It is Preferable that the contacting conditions further include a gas volume hourly space velocity within a range of 1,500-2,000 h$^{-1}$.

According to the present disclosure, the composite material not only has desirable adsorbability, but also has excellent regeneration properties. Therefore, the method further comprises regenerating the composite material. The present disclosure does not impose the special requirements on the regeneration method, for example, the regeneration mode may be thermal regeneration and/or water wash regeneration. The composite material of the present disclosure may be subjected to the thermal regeneration and/or water wash regeneration under the conventional conditions.

More preferably, the thermal regeneration mode is carried out by a gas purge, the conditions of gas purge comprise a gas volume hourly space velocity within a range of 1,000-1,500 h$^{-1}$, a temperature of 150-250° C., and the purge gas is a non-reactive gas or an inert gas (e.g., nitrogen).

More preferably, the conditions of water wash regeneration comprise a liquid hourly space velocity within a range of 0.5-1.5 h$^{-1}$ and a temperature of 25-40° C.

According to the desulfurization method of the present disclosure, the sulfur-containing gas is at least one of the heating furnace exhaust gas of the petroleum refining industry, sulfur tail gas and catalytic cracking regenerative flue gas.

The present disclosure also provides a system with a desulfurization function, wherein the system comprises:

an oxidation unit for treating sulfur-containing gas and recovering sulfur;

a hydrogenation purification unit, which is connected with the oxidation unit for subjecting the oxidation tail gas from the oxidation unit to hydrogenation reduction and recovering hydrogen sulfide in the reduced product obtained from the hydrogenation reduction;

an incineration unit for incinerating the purified tail gas discharged from the hydrogenation purification unit;

an adsorption unit for adsorbing $SO_2$ from the $SO_2$-containing flue gas obtained by incineration, wherein the adsorbent used in the adsorption unit is the aforementioned composite material In accordance with the system of the present disclosure, in order to facilitate regeneration of the composite material in the adsorption unit, the adsorption unit comprises an inlet and an outlet of substance used for regeneration, thereby facilitating introduction of the substance used for regeneration (heat source or washing water) into the adsorption unit for regenerating the composite material. It is preferably that the adsorption unit is further connected with the oxidation unit, such that the $SO_2$-containing regeneration gas obtained from regeneration is returned to the oxidation unit and subjected to retreatment.

Figure 1:
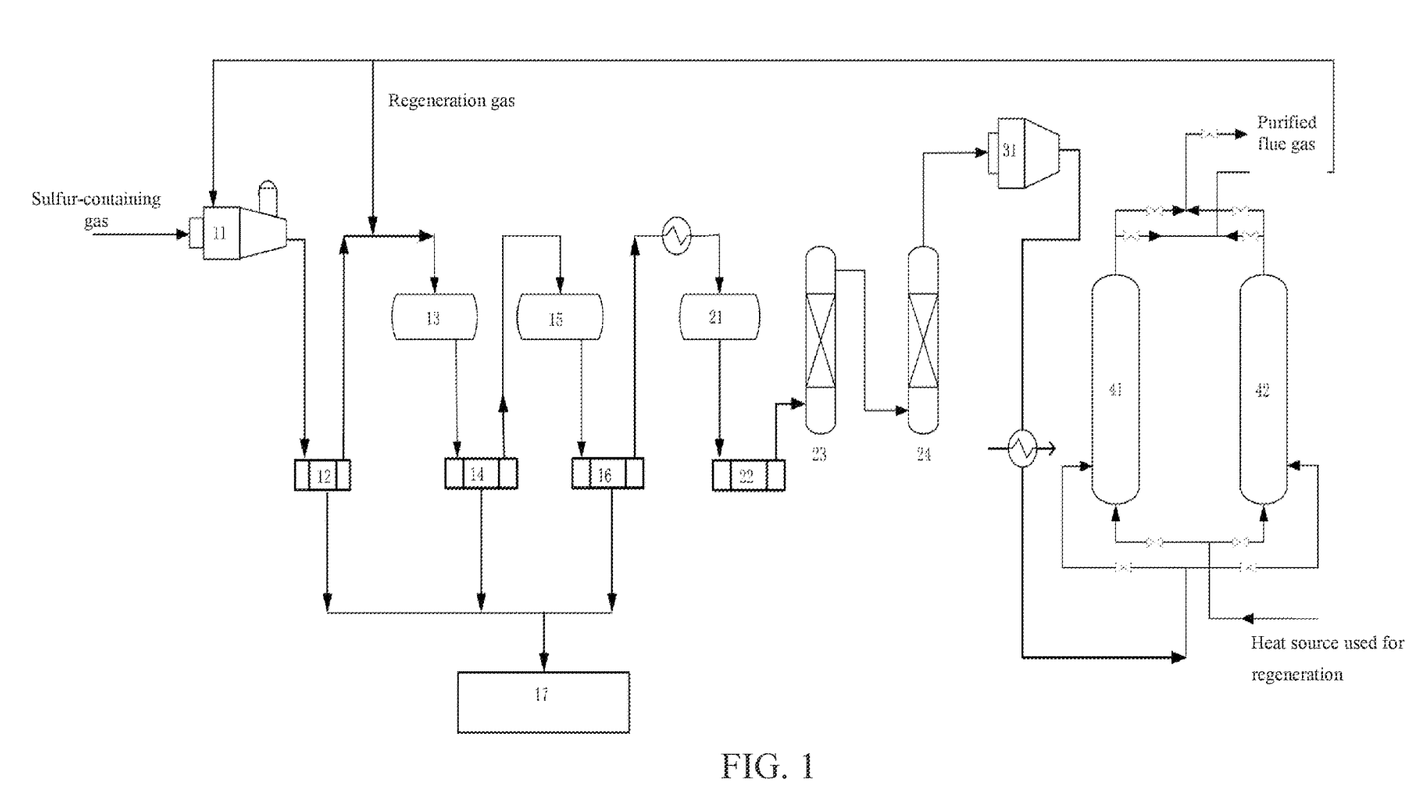
FIG. 1 illustrates a schematic structure diagram of a system according to a preferred embodiment of the present disclosure.
Figure 2:
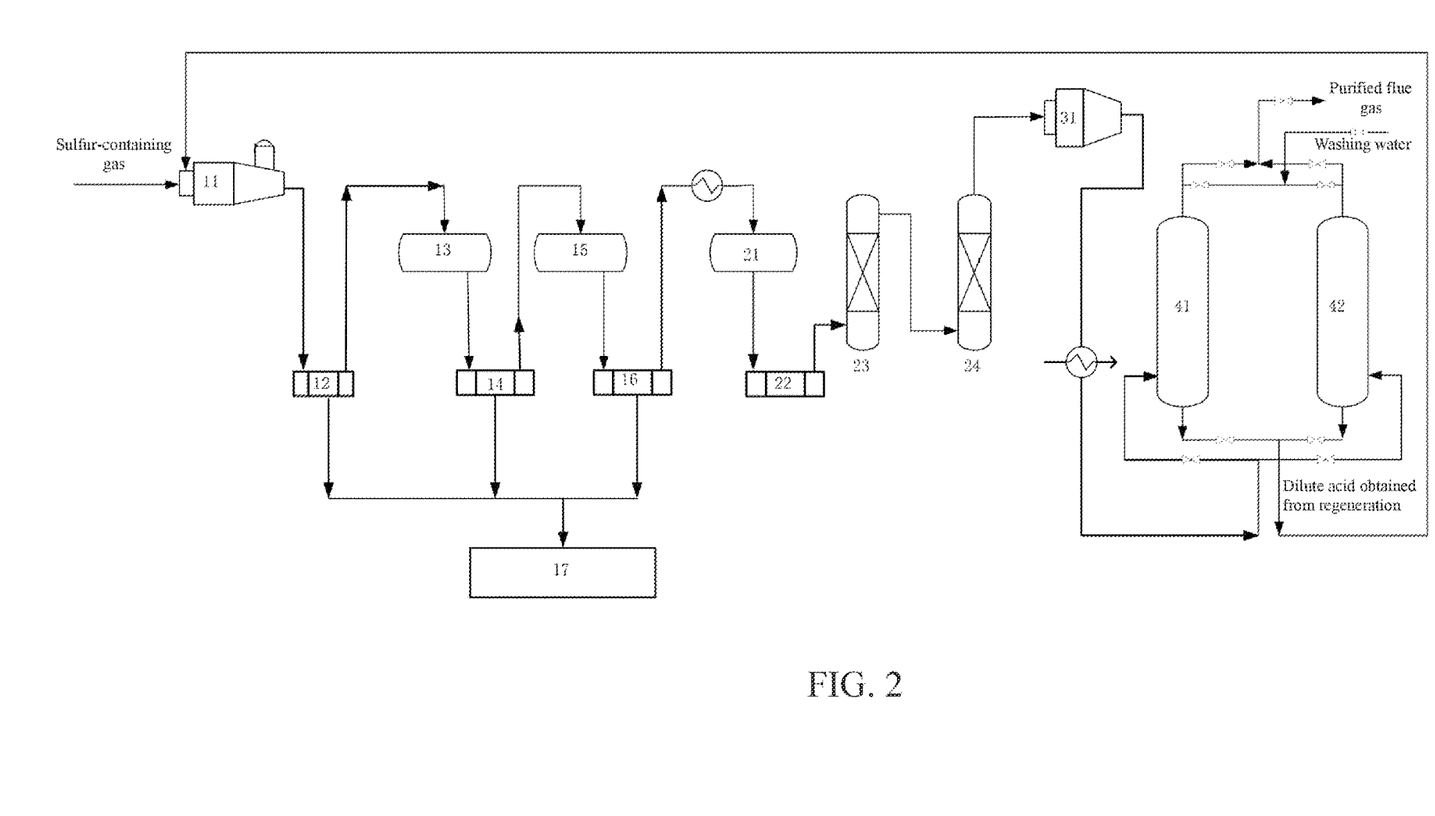
FIG. 2 illustrates a schematic structure diagram of a system according to another preferred embodiment of the present disclosure.

In order to achieve continuous operation of the system according to the present disclosure, it is preferable that the adsorption unit comprises at least two adsorption towers (e.g., a first adsorption tower 41 and a second adsorption tower 42) for an alternate use to continuously adsorb $SO_2$ in the $SO_2$-containing flue gas obtained from the incineration. When the composite material is regenerated by means of the thermal regeneration, as shown in FIG. 1, the hot gas (e.g., hot nitrogen gas) may be introduced from the bottom of the adsorption tower, the produced regeneration gas is discharged from the top of the adsorption tower, an oxidation unit may be further introduced for performing retreatment. When the composite material is regenerated by means of the water wash regeneration, as shown in FIG. 2, the washing water may be introduced from the top of the adsorption tower, the produced regenerated dilute acid is discharged from the bottom of the adsorption tower, an oxidation unit may be further introduced for carrying out retreatment.

According to the system of the present disclosure, the oxidation unit may comprise a liquid sulfur pool 17 and a thermal reaction furnace 11, a first stage condenser 12 and a catalytic converter which are connected in sequence, wherein the liquid sulfur pool 17 is connected with the first stage condenser 12 and the catalytic converter so as to collect the cooled liquid sulfur. In order to recover sulfur in a more efficient manner, the oxidation unit preferably comprises a liquid sulfur pool 17 and a thermal reaction furnace 11, a first stage condenser 12, a primary catalytic converter 13, a second stage condenser 14, a secondary catalytic converter 15 and a third stage condenser 16 which are connected in sequence; the liquid sulfur pool 17 is connected with the first stage condenser 12, the second stage condenser 14 and the third stage condenser 16 respectively, so as to collect the cooled liquid sulfur.

According to the system of the present disclosure, the hydrogenation purification unit may comprise a hydrogenation reactor 21, a hydrogenation tail gas cooler 22, a quench tower 23 and an absorption tower 24 which are connected in sequence. The oxidation tail gas discharged from the oxidation unit is subjected to hydrogenation reduction in the hydrogenation reactor 21, and then cooled in the hydrogenation tail gas cooler 22 and the quench tower 23, and subsequently entered into the absorption tower 24 to absorb hydrogen sulfide in the reduction product.

According to the system of the present disclosure, the incineration unit may be an incinerator and/or a catalytic incineration reactor.

According to the system of the present disclosure, the oxidation unit, the hydrogenation purification unit and the incineration unit are used for reducing the content of sulfur in a sulfur-containing gas, which is mainly composed of hydrogen sulfide, the adsorption unit provided with an adsorbent material is used for further reducing the content of sulfur dioxide.

The present disclosure also provides a method of desulfurization, the method comprises the following steps:
(a) Oxidizing the sulfur-containing gas to be treated and recovering the sulfur;
(b) Subjecting the oxidized tail gas to hydrogenation reduction and recovering hydrogen sulfide from the reduction product obtained from the hydrogenation reduction;
(c) Incinerating the tail gas obtained after the hydrogenation reduction;
(d) Contacting the incinerated $SO_2$-containing flue gas with a sorbent to adsorb $SO_2$, the sorbent is the aforementioned composite material.

The present disclosure does not impose special requirements on the conditions of contact in step (d), but preferably, the conditions of contact comprise a temperature within the range of 100-150° C. Preferably, the conditions of contact further comprise a gas volume hourly space velocity within the range of 1,500-2,000 $h^{-1}$.

In accordance with the present disclosure, the composite material not only has desirable adsorbability, but also has excellent regeneration property. Therefore, the method further comprises regenerating the adsorbent. The present disclosure does not impose the special requirements on the regeneration method, for example, the regeneration mode may be thermal regeneration and/or water wash regeneration. The composite material of the present disclosure may be subjected to the thermal regeneration and/or water wash regeneration under the conventional conditions. In order to further ensure zero emission of sulfur, the method also comprises regenerating the adsorbent, and returning the $SO_2$-containing regeneration gas obtained from the regeneration process to step (a) and subjecting to retreatment.

More preferably, the thermal regeneration mode is carried out by a gas purge, the conditions of gas purge comprise a gas volume hourly space velocity within a range of 1,000-1,500 $h^{-1}$, a temperature of 150-250° C., and the purge gas is a non-reactive gas or an inert gas (e.g., nitrogen).

More preferably, the conditions of water wash regeneration comprise a liquid hourly space velocity within a range of 0.5-1.5 $h^{-1}$ and a temperature of 25-40° C.

Those skilled in the art can select the time of regeneration, as long as the sulfur capacity of the regenerated composite material is recovered to 95% or more of the composite material at its initial condition.

The present disclosure does not impose special requirement on the oxidation process in step (a), as long as the sulfur-containing gas is subjected to the Claus reaction to obtain sulfur. For example, the oxidation process may comprise the following steps: the sulfur-containing gas is successively subjected to combustion, first stage cooling and catalytic reaction.

Preferably, the conditions of combustion comprise a temperature within the range of 900-1,400° C. and a residence time of 2-3 seconds. In the present disclosure, the term "residence time" refers to the residence time of the sulfur-containing gas in the combustion vessel, i.e. the time for the sulfur-containing gas to pass through the combustion furnace, namely the reaction time of the gas.

Preferably, the conditions of the first stage cooling cause that a temperature of the cooled gas is within a range of 120-180° C.

Preferably, the conditions of catalytic reaction comprise: the catalyst is an aluminium oxide-based catalyst and/or a titanium oxide-based catalyst, the gas volume hourly space velocity is within a range of 500-1,000 $h^{-1}$, and the temperature is within the range of 200-350° C.

More preferably, the mode of catalytic reactions comprises the primary catalytic reaction, the second stage cooling, the secondary catalytic reaction and the third stage cooling which are carried out in sequence. Further preferably, the conditions for the primary catalytic reaction comprise that the catalyst is an aluminium oxide-based catalyst and/or a titanium oxide-based catalyst, the gas volume hourly space velocity is within a range of 600-800 $h^{-1}$, and the temperature is within the range of 290-330° C. Further preferably, the conditions for the second stage cooling cause that the temperature of the cooled gas is within a range of 130-160° C. Further preferably, the conditions for the secondary catalytic reaction comprise that the catalyst is an aluminium oxide-based catalyst, the gas volume hourly space velocity is within a range of 600-800 $h^{-1}$, and the temperature is within the range of 220-250° C. Further preferably, the conditions for the third stage cooling cause that the temperature of the cooled gas is within a range of 130-160° C.

In the present disclosure, the aluminium oxide-based catalyst is composed of $Al_2O_3$ as the main ingredient, and has a specific surface area equal to or larger than 350 $m^2/g$, a pore volume equal to or larger than 0.45 ml/g, the catalyst is commercially available, for example, the catalyst is LS-02 catalyst purchased from the Shandong Qilu Keli Chemical Institute Co., Ltd. The titanium oxide-based catalyst is composed of $TiO_2$ as the main ingredient, and has a specific surface area equal to or larger than 180 $m^2/g$, a pore volume equal to or larger than 0.3 ml/g, the catalyst is commercially available, for example, the catalyst is LS-981 catalyst purchased from the Shandong Qilu Keli Chemical Institute Co., Ltd.

According to the present disclosure, the conditions for the hydrogenation reduction in step (b) may comprise that the hydrogenation catalyst is a Co—Mo-based tail gas hydrogenation catalyst, the gas volume hourly space velocity is within the range of 500-1,000 $h^{-1}$, and the temperature is within the range of 220-350° C. Preferably, the mode of recovering the hydrogen sulfide in the reduction product obtained from the hydrogen reduction is as follows: lowering the temperature of the reduction product obtained by the hydrogen reduction to 30-40° C., and using an amine liquid to absorb the hydrogen sulfide in the product after lowering the temperature. The concentration of amine in the amine liquid may be 20-50 wt. %. The amine in the amine liquid may be various alcohol amine based desulfurizers, wherein a composite type MethyldiethanolaMine (MDEA) is preferred. The amine liquid may be KMKTS-15 high efficiency desulfurizer commercially available from the Zibo Kaimeike Trade Co., Ltd.

In the present disclosure, the Co—Mo based tail gas hydrogenation catalyst may be a low temperature hydrogenation catalyst for Claus tail gas, which uses the modified $Al_2O_3$ as the carrier, and is composed of active metal ingredients such as cobalt and molybdenum, it has a specific surface area equal to or larger than 200 m²/g, and is commercially available, for example, the catalyst is the LSH-02 catalyst purchased from the Shandong Qilu Keli Chemical Institute Co., Ltd. The Co—Mo based tail gas hydrogenation catalyst can also be a specific catalyst for Claus tail gas hydrogenation, which uses the modified $Al_2O_3$ as the carrier, and is composed of active metal ingredients such as cobalt and molybdenum, it has a specific surface area equal to or larger than 300 m²/g, and is commercially available, for example, the catalyst is the LS-951T catalyst purchased from the Shandong Qilu Keli Chemical Institute Co., Ltd.

According to the present disclosure, the conditions of incineration in the step (c) may comprise a temperature within the range of 600-800° C. and a residence time of 2-3 seconds.

According to the present disclosure, the incineration in step (c) may be performed with the conventional incineration mode. Preferably, the incineration mode is catalytic incineration. The conditions of the catalytic incineration comprise that the catalyst is a catalytic incineration catalyst containing iron and vanadium, the temperature is within a range of 250-350° C., the gas volume hourly space velocity is within a range of 500-1,000 h$^{-1}$. The specific composition of the catalytic incineration catalyst containing iron and vanadium comprise: $Fe_2O_3$ 2-8 wt. %, $V_2O_5$ 1-4 wt. %, and the balance is white carbon black.

According to the present disclosure, the content of $CO_2$ in the sulfur-containing gas is 3-5%, the content of $SO_2$ is 20-1,000 ppm by volume, the content of NOx is 20-150 ppm by volume, the content of $O_2$ is 3-5%, the content of $H_2O$ is 3-10 wt. %.

According to the present disclosure, the method is implemented in the aforementioned system.

EXAMPLES

The present disclosure will be described in detail with reference to examples. In the following examples:
The activated carbon is purchased from the Suzhou Tan Xuan Feng Activated Carbon, Co., Ltd.;
The alkaline silica sol is commercially available from the Qingdao Zhongneng Silicon Chemical Co., Ltd.;
The polyethylene glycol has a weight average molecular weight within the range of 1,900-2,200, is purchased from Wuxi Yatai United Chemical Co., Ltd.;
The sesbania powder has a weight average molecular weight of 206,000, is purchased from the Lankao County Plant Glue Factory in Henan Province.
Starch has a weight average molecular weight of 55,000, is commercially available from Shandong Hengren Industry and Trade Co., Ltd.
Cellulose is Aqualon hydroxyethylcellulose manufactured by the Ashland Specialty Chemicals Incorporation in the United states of America, it has a weight average of 380,000;
The water glass has a $SiO_2$ content of 26.5 wt. %, it is purchased from the Bengbu Jingcheng Chemical Co., Ltd.;
The extruding machine has a model number ZYDJ-30, the manufacture is Zibo Yuecheng Machinery Co., Ltd.;
The method of measuring the elemental composition is X-ray fluorescence method, the specific detection process is in compliance with the National Standard GB/T 30905-2014 of China, the method is used in conjunction with X-ray photoelectron energy spectrum analysis to determine the valence state of the elements; the content of activated carbon is obtained by the combustion method;

The detection methods of pore volume fraction, specific surface area and pore volume are performed with reference to the National Standard GB/T6609.35-2009 of China.

Example 1

The example served to illustrate the composite material (or adsorbent) of the present disclosure and the preparation method thereof.

925 g of coconut shell activated carbon having a specific surface area of 906 m²/g, 32.67 g of sodium bicarbonate having a purity of 99 wt. %, and 28 g of polyethylene glycol having a purity of 99 wt. % were taken, the three compounds were uniformly blended to form the material A.

66.67 g of alkaline silica sol (with the $SiO_2$ content of 30 wt. %) was weighted, the silica sol was dissolved in 360 g of deionized water, the mixture was stirred uniformly and formulated into a binder.

The binder was added to the material A and was extruded on a strip extruder to obtain the strip-shaped materials having a size of φ3-5 mm×10 mm, which was initially subjected to drying at 60° C. for 3 hours and then subjected to drying at 120° C. for 5 hours, and then subjected to calcination at 550° C. for 4 hours, in order to produce a modified activated carbon (or adsorbent carrier), the specific surface area and pore volume of the modified activated carbon were measured, the results were described in Table 4.

45.43 g ferric nitrate ($Fe(NO_3)_3$), 26.58 g lanthanum nitrate hexahydrate ($La(NO_3)_3 \cdot 6H_2O$), 50.45 g cerium nitrate hexahydrate ($Ce(NO_3)_3 \cdot 6H_2O$) were dissolved in deionized water, the mixture was stirred uniformly to form a stable solution, the impregnation solution of the auxiliary agent is obtained according to the metered volume of the added amount of the adsorbent carrier, the adsorbent carrier was impregnated at 25° C. according to an equal volume impregnation method, the impregnation time was 1 h, the impregnated material was subjected to drying at 120° C. for 6 hours, and calcination at 400° C. for 4 hours, the adsorbent was prepared, the elemental composition (in wt. %) of the adsorbent was measured, the measurement results were shown in Table 2, the measurement results of the specific surface area and pore volume of the adsorbent were shown in Table 4.

Examples 2-11

The adsorbents were prepared according to the same steps and conditions of Example 1, except that the composition, preparation conditions or concentration of the impregnation solution were modified, the specific preparation conditions were illustrated in Table 1. The contents of respective metal oxides and activated carbon (in wt. %) of the finally produced adsorbent products were shown in Table 2, the measurement results of the specific surface area and other parameters were illustrated in Table 4.

TABLE 1

| No. of Examples | Binder | Pore-enlarging agent | Precursor of alkali metal | Drying of carriers | Calcination of carriers | Impregnation | Drying after impregnation | Calcination after impregnation |
|---|---|---|---|---|---|---|---|---|
| Example 2 | Silicon sol | Polyethylene glycol | Sodium bicarbonate | 60° C., 3 h 120° C., 5 h | 550° C., 4 h | 25° C., 1 h | 120° C., 6 h | 400° C., 4 h |
| Example 3 | Silicon sol | Polyethylene glycol | Sodium bicarbonate | 60° C., 3 h 120° C., 5 h | 550° C., 4 h | 25° C., 1 h | 120° C., 6 h | 400° C., 4 h |
| Example 4 | Silicon sol | Polyethylene glycol | Sodium bicarbonate | 60° C., 3 h 120° C., 5 h | 550° C., 4 h | 25° C., 1 h | 120° C., 6 h | 400° C., 4 h |
| Example 5 | Silicon sol | Polyethylene glycol | Sodium bicarbonate | 60° C., 3 h 120° C., 5 h | 550° C., 4 h | 25° C., 1 h | 120° C., 6 h | 400° C., 4 h |
| Example 6 | Silicon sol | Polyethylene glycol | Sodium bicarbonate | 60° C., 3 h 120° C., 5 h | 550° C., 4 h | 25° C., 1 h | 120° C., 6 h | 400° C., 4 h |
| Example 7 | Silicon sol | Polyethylene glycol | Sodium bicarbonate | 60° C., 3 h 120° C., 5 h | 550° C., 4 h | 25° C., 1 h | 120° C., 6 h | 400° C., 4 h |
| Example 8 | Water glass | Sesbania powder | Sodium bicarbonate | 80° C., 2 h 160° C., 4 h | 600° C., 3 h | 35° C., 40 min | 140° C., 3 h | 450° C., 2 h |
| Example 9 | Water glass | Starch | Sodium carbonate | 40° C., 7 h 100° C., 6 h | 450° C., 6 h | 30° C., 1 h | 110° C., 6 h | 380° C., 4 h |
| Example 10 | Silicon sol | Citric acid | Sodium carbonate | 50° C., 3 h 130° C., 4 h | 500° C., 5 h | 20° C., 1.5 h | 80° C., 10 h | 350° C., 8 h |
| Example 11 | Silicon sol | Sesbania powder | Potassium bicarbonate | 70° C., 2.5 h 110° C., 5 h | 480° C., 5.5 h | 10° C., 2 h | 130° C., 4 h | 420° C., 3 h |

TABLE 2

| No. of Examples | $Na_2O$ | $SiO_2$ | $Fe_2O_3$ | $CeO_2$ | $La_2O_3$ | Activated carbon | Whether formula I is satisfied |
|---|---|---|---|---|---|---|---|
| Example 1 | 1 | 2 | 1.5 | 2 | 1 | 92.5 | Yes |
| Example 2 | 1 | 2 | 1 | 1 | 1 | 94 | Yes |
| Example 3 | 1 | 2 | 2 | 3 | 1 | 91 | Yes |
| Example 4 | 1 | 1 | 1.5 | 2 | 2 | 92.5 | Yes |
| Example 5 | 0.5 | 2 | 1.5 | 2.5 | 1 | 92.5 | Yes |
| Example 6 | 1.5 | 2.5 | 1.5 | 1.5 | 1.5 | 91.5 | Yes |
| Example 7 | 1 | 1.5 | 1.5 | 2 | 1.5 | 92.5 | Yes |
| Example 8 | 1 | 1 | 1.5 | 3 | 3 | 90.5 | Yes |
| Example 9 | 0.5 | 2 | 1.5 | 0.5 | 1 | 94.5 | Yes |
| Example 10 | ($K_2O$) 1 | 2 | 2.5 | 2 | 1 | 91.5 | Yes |
| Example 11 | ($K_2O$) 1 | 2 | 0.5 | 2 | 1 | 93.5 | Yes |

Example 12

The coconut shell activated carbon with a specific surface area of 906 m²/g, sodium bicarbonate with a purity of 99 wt. %, polyethylene glycol with a purity of 99 wt. %, alkaline silica sol (with the $SiO_2$ content of 30 wt. %), iron nitrate, lanthanum nitrate hexahydrate, cerium nitrate hexahydrate and deionized water were mixed; relative to 100 g of activated carbon, the used amount of polyethylene glycol was 2 g, the used amount of deionized water was 12 g; the used amount of other ingredients caused that the weight ratio among the activated carbon, alkali metal elements, silicon element, iron element and rare earth elements in the produced adsorbent was the same as that in Example 1. The produced mixture was extruded and molded on a strip extruder to obtain the strip-shaped materials having a size of 3-5 mm×10 mm, the materials were initially subjected to drying at 60° C. for 3 hours and then subjected to drying at 120° C. for 5 hours, and subsequently subjected to calcination at 550° C. for 4 hours, such that the adsorbent was produced. The measurement results of the specific surface area of the adsorbent were shown in Table 4.

Example 13

The coconut shell activated carbon with a specific surface area of 906 m²/g, sodium bicarbonate with a purity of 99 wt. %, polyethylene glycol with a purity of 99 wt. %, alkaline silica sol (with the $SiO_2$ content of 30 wt. %), iron nitrate, lanthanum nitrate hexahydrate, cerium nitrate hexahydrate and deionized water were mixed; relative to 100 g of activated carbon, the used amount of polyethylene glycol was 5 g, the used amount of deionized water was 12 g, the used amount of other ingredients caused that the weight ratio among the activated carbon, alkali metal elements, silicon element, iron element and rare earth elements in the produced adsorbent was the same as in Example 5. The produced mixture was extruded and molded on a strip extruder to obtain the strip-shaped materials having a size of 3-5 mm×10 mm, the materials were initially subjected to drying at 65° C. for 3 hours and then subjected to drying at 110° C. for 5 hours, and subsequently subjected to calcination at 530° C. for 4 hours, such that the adsorbent was produced. The measurement results of the specific surface area of the adsorbent were shown in Table 4.

Example 14

The adsorbent was prepared according to the same steps and conditions of Example 1, except that the polyethylene glycol was replaced with an equal weight of cellulose.

Comparative Examples 1-6

The adsorbents were prepared according to the same steps and conditions of Example 1, except that the concentration of the impregnation solution was modified, such that the contents of the individual metal oxide and activated carbon (in wt. %) of the finally produced adsorbent products were shown in Table 3, the measurement results of the specific surface area and other parameters were shown in Table 4.

Gasification chamber temperature: 275° C.
Flow rate of the carrier gas ($N_2$): 90 ml/min;
Injection quantity: 1 μL
The composition of the inlet gas by volume was as follows: $CO_2$ 3 vol. %, $SO_2$ 0.03 vol. % (900 mg/m$_3$), $H_2O$

TABLE 3

| Numbers | $Na_2O$ | $SiO_2$ | $Fe_2O_3$ | $CeO_2$ | $La_2O_3$ | Activated carbon | Whether formula I is satisfied |
|---|---|---|---|---|---|---|---|
| Comparative Example 1 | 1 | 2 | 0 | 2 | 1 | 94 | No |
| Comparative Example 2 | 1 | 2 | 3.5 | 0 | 1.5 | 92 | No |
| Comparative Example 3 | 1 | 1 | 2 | 3 | 0 | 93 | No |
| Comparative Example 4 | 1 | 2 | 1.5 | 0 | 0 | 95.5 | Yes |
| Comparative Example 5 | 1.5 | 0 | 1.5 | 1.5 | 1.5 | 94 | No |
| Comparative Example 6 | 0 | 1.5 | 1.5 | 2 | 1.5 | 93.5 | No |

Comparative Examples 7-9

The adsorbents were prepared according to the same steps and conditions of Example 1, except that the iron nitrate was replaced with equal weights of copper nitrate, manganese nitrate and zinc nitrate (calculated based on metal oxides), respectively.

Comparative Example 10

The adsorbent was prepared according to the same steps and conditions of Example 1, except that the lanthanum nitrate hexahydrate and the cerium nitrate hexahydrate were replaced with equal weight of nickel nitrate (calculated based on metal oxides).

Comparative Example 11

The adsorbent was prepared according to the same steps and conditions of Example 1, except that the alkaline silica sol was replaced with an equal weight of concentrated sulfuric acid (98 wt. %).

Test Example 1

The adsorption activity evaluation was performed on the adsorbents prepared in the Examples and the Comparative Examples:

The reaction vessel of the micro-reactor was made of stainless steel tubes with an inner diameter of 20 mm, the reaction vessel was placed in an incubator. The loading amount of the adsorbent was 10 ml, the upper part of the reaction vessel was filled with quartz sand having the same particle size as the adsorbent, the two substances were subjected to mixing and pre-heating. The contents of $SO_2$ in the inlet and outlet gases of the reaction vessel were analyzed by using a morphological sulfur chromatograph produced by the Agilent Technologies China Co., Ltd.

The operating conditions of chromatograph were as follows:
  chromatography column: Agilent 7890B
  Detector: Antek 7090 (SCD)
  Chromatography column: stainless steel column with a length of 30 m, an internal diameter of 0.32 mm, a liquid membrane thickness of 4 μm; and a liquid membrane specification PDMS-1
  Column temperature: 250° C.
  Detector temperature: 950° C.

3 vol. %, the balance was $N_2$, the gas volume hourly space velocity was 1,750 $H^{-1}$, and the reaction temperature was 120° C.

The removal rate η $SO_2$ of $SO_2$ for the sorbent was calculated according to the following formula:

$$\eta SO_2 = \frac{N_0 - N_1}{N_0} \times 100\%$$

Wherein $N_0$ and $N_1$ represented the volumetric concentration of $SO_2$ at the inlet and outlet, respectively.

The sulfur capacity was calculated according to the following formula:

$$Y = \frac{M_{sulfur}}{M_{catalyst}} \times 100\%$$

Wherein $M_{sulfur}$ represents the weight of sulfur adsorbed by activated carbon and $M_{catalyst}$ represents the weight of the adsorbent used for adsorbing sulfur; the saturated sulfur capacity refers to the maximum amount of sulfur that can be absorbed by an unit weight of the desulfurizing agent, that is, the fresh adsorbent was continuously contacted with the sulfur-containing gas, when the sulfur content of sulfur-containing gas before its contact with the adsorbent is equal to the sulfur content of sulfur-containing gas after its contact with the adsorbent, the percentage of the sulfur content adsorbed by the adsorbent relative to the adsorbent was exactly the saturated sulfur capacity.

Sulfur breakthrough capacity: referred to the weight percent of sulfur that can be adsorbed by the sorbent at certain conditions of use while ensuring the cleanness indicator of the process. In other words, when the sulfur content in the processed gas at an outlet is greater than the purification degree indicator of the process, the entire spent catalyst was immediately removed, the sulfur capacity measured by the samples on average was denoted as the sulfur breakthrough capacity. In the present disclosure, it was deemed to reach the sulfur breakthrough capacity when the $SO_2$ removal rate was reduced to 99%, that, the sulfur breakthrough capacity in the present disclosure referred to the sulfur capacity of the sorbent when the $SO_2$ removal rate was reduced to 99%, the total time of the sorbent in use before achieving the sulfur breakthrough capacity was defined as the time length of adsorption.

The analysis results were shown in Table 4.

was 6 h. The $SO_2$ removal test was carried out by using the regenerated adsorbent, and the adsorbent was subjected to regeneration when the sulfur breakthrough capacity was reached, the adsorbent was continuously regenerated for 5

TABLE 4

|  | Adsorbent | | | | Pore distribution | | | | | |
|---|---|---|---|---|---|---|---|---|---|---|
|  | Carriers | | | | Percentage of the pore volume of the pores having a pore size below 3 nm, % | Percentage of the pore volume of the pores having a pore size below 1 nm, % | Percentage of the pore volume of the pores having a pore size within 1-2 nm, % | Adsorption time, h | Saturated sulfur capacity, % | Sulfur breakthrough capacity, % |
|  | Specific surface area, $m^2/g$ | Pore volume, ml/g | Specific surface area, $m^2/g$ | Pore volume, ml/g | | | | | | |
| Example 1 | 678 | 0.42 | 572 | 0.38 | 87.5 | 7.5 | 54.5 | 142 | 23.8 | 15.9 |
| Example 2 | 692 | 0.43 | 580 | 0.38 | 86.2 | 7.2 | 52.9 | 138 | 21.5 | 15.6 |
| Example 3 | 665 | 0.42 | 562 | 0.37 | 87.3 | 8.8 | 53.2 | 140 | 22.8 | 15.8 |
| Example 4 | 670 | 0.40 | 582 | 0.36 | 85.5 | 6.7 | 51.7 | 137 | 22.6 | 15.7 |
| Example 5 | 659 | 0.42 | 569 | 0.38 | 87.1 | 8.1 | 49.8 | 136 | 21.8 | 15.6 |
| Example 6 | 681 | 0.44 | 581 | 0.39 | 86.4 | 7.9 | 48.6 | 138 | 22.6 | 15.7 |
| Example 7 | 652 | 0.42 | 558 | 0.37 | 85.8 | 9.2 | 49.5 | 139 | 23.3 | 15.7 |
| Example 8 | 648 | 0.43 | 578 | 0.37 | 81.2 | 6.5 | 46.2 | 112 | 18.8 | 12.5 |
| Example 9 | 669 | 0.41 | 588 | 0.36 | 80.8 | 5.9 | 41.8 | 110 | 18.6 | 12.3 |
| Example 10 | 652 | 0.42 | 568 | 0.37 | 84.5 | 6.5 | 51.2 | 128 | 20.5 | 14.5 |
| Example 11 | 663 | 0.43 | 572 | 0.38 | 85.0 | 6.8 | 50.6 | 122 | 19.8 | 14.2 |
| Example 12 | — | — | 591 | 0.4 | 82.4 | 7 | 47.9 | 118 | 19.3 | 13.1 |
| Example 13 | — | — | 585 | 0.38 | 83.1 | 7.2 | 48.2 | 132 | 20.2 | 13.5 |
| Example 14 | 632 | 0.38 | 545 | 0.34 | 81.5 | 8.8 | 44.2 | 95 | 14.2 | 10.1 |
| Comparative Example 1 | 670 | 0.43 | 598 | 0.4 | 82.5 | 12.5 | 40.2 | 82 | 13.5 | 9.5 |
| Comparative Example 2 | 672 | 0.42 | 610 | 0.38 | 78.9 | 12.5 | 38.5 | 86 | 13.9 | 9.1 |
| Comparative Example 3 | 665 | 0.43 | 578 | 0.37 | 80.8 | 11.2 | 37.9 | 82 | 14.0 | 9.4 |
| Comparative Example 4 | 675 | 0.42 | 572 | 0.37 | 77.5 | 9.8 | 35.9 | 78 | 13.4 | 9.2 |
| Comparative Example 5 | 651 | 0.38 | 545 | 0.33 | 81.5 | 11.5 | 38.1 | 102 | 15.2 | 10.8 |
| Comparative Example 6 | 658 | 0.4 | 552 | 0.36 | 82.1 | 9.7 | 37.3 | 99 | 14.9 | 10.2 |
| Comparative Example 7 | 668 | 0.42 | 570 | 0.38 | 79.5 | 12.7 | 36.2 | 93 | 11.9 | 9.5 |
| Comparative Example 8 | 671 | 0.43 | 559 | 0.37 | 77.6 | 13.5 | 34.5 | 78 | 10.2 | 8.9 |
| Comparative Example 9 | 669 | 0.41 | 561 | 0.36 | 75.8 | 12.9 | 35.7 | 92 | 12.1 | 9.2 |
| Comparative Example 10 | 658 | 0.43 | 559 | 0.38 | 80.5 | 15.1 | 32.5 | 72 | 10.9 | 8.5 |
| Comparative Example 11 | 662 | 0.4 | 562 | 0.36 | 78.5 | 10.2 | 37.8 | 93 | 12.8 | 9.2 |
| Coconut shell activated carbon | — | — | — | — | — | | | 45 | 6.8 | 5.2 |

As can be seen from the results of Table 4, the composite material of the present disclosure had a relatively high saturated sulfur capacity and sulfur breakthrough capacity.

Test Example 2

The adsorbents prepared in Example 1 and Comparative Example 1 were subjected to $SO_2$ removal test (the specific method was the same as that in the Test example 1), when the adsorption of $SO_2$ by the adsorbent had a breakthrough and reached the sulfur breakthrough capacity of the adsorbent, the adsorption of $SO_2$-containing gas was stopped, the regeneration performance of the adsorbent was examined by switching to an introduction of nitrogen gas. The regeneration conditions were that the gas volume hourly space velocity was 1,200 $h^{-1}$, the temperature was 200° C., nitrogen gas was used as the purge gas, and the regeneration time times. The results of the sulfur breakthrough capacity of the adsorbent in regard to $SO_2$ following each time of regeneration were shown in Table 5.

TABLE 5

| Number of regeneration | Sulfur breakthrough capacity, % | |
|---|---|---|
| | Example 1 | Comparative Example 1 |
| 1 | 15.8 | 9 |
| 2 | 15.8 | 8.8 |
| 3 | 15.7 | 8.2 |
| 4 | 15.7 | 7.5 |
| 5 | 15.7 | 6.9 |

The data in Table 5 demonstrated that the sulfur breakthrough capacity of the adsorbent of the present disclosure remains substantially unchanged, and the composite material of the present disclosure exhibited excellent regeneration performance. The further experiments proved that the regeneration performance of the adsorbents obtained in Examples 2-7 was similar to that of Example 1 (the results were not shown).

Test Example 3

Desulfurization was performed by using the system of the present disclosure, as shown in FIG. 1, the system comprises:

an oxidation unit for treating the sulfur-containing gas and recovering the sulfur, comprising a liquid sulfur pool 17 and a thermal reaction furnace 11, a first stage condenser 12, a primary catalytic converter 13, a second stage condenser 14, a secondary catalytic converter 15 and a third stage condenser 16 which were connected in sequence; the liquid sulfur pool 17 was connected with the first stage condenser 12, the second stage condenser 14 and the third stage condenser 16 respectively, so as to collect the cooled liquid sulfur.

a hydrogenation purification unit, connected with the oxidation unit, for subjecting the oxidation tail gas discharged from the oxidation unit to hydrogenation reduction and recovering hydrogen sulfide in the reduced product obtained from the hydrogenation reduction; the hydrogenation purification unit comprising a hydrogenation reactor 21, a hydrogenation tail gas cooler 22, a quench tower 23 and an absorption tower 24 which were connected in sequence;

an incineration unit 31 for incinerating the purified tail gas discharged from the hydrogenation purification unit;

an adsorption unit for adsorbing $SO_2$ in the $SO_2$-containing flue gas obtained from incineration, the adsorbent used in the adsorption unit was the composite material prepared in the present disclosure, the adsorption unit comprising a first adsorption tower 41 and a second adsorption tower 42, which can be alternately used to achieve continuous adsorption;

a heat exchange unit including a tail gas reheater 111 and a flue gas heat exchanger 222, wherein the tail gas reheater 111 was disposed between the oxidation unit and the hydrogenation purification unit for heating the oxidized tail gas discharged from the oxidation unit, and the flue gas heat exchanger 222 was disposed between the incineration unit and the adsorption unit for lowering temperature of the flue gas generated by the incineration.

The steps of desulfurization were as follows (the specific operating conditions were shown in Table 6):

(a) Treatment of sulfur-containing gas and recovery of sulfur in an oxidation unit.

The acid gas containing 85 vol. % hydrogen sulfide (further containing $CO_2$ in an amount of 10 vol. %, hydrocarbon in an amount of 2 vol. %, $NH_3$ in an amount of 3 vol. %) in the thermal reaction unit was partially combusted in the thermal reaction furnace 11 to converting hydrogen sulfide into sulfur dioxide: the reaction was performed at high temperatures, the hydrogen sulfide and the sulfur dioxide performed the Claus reaction to produce elemental sulfur and process gas, the elemental sulfur was cooled by the first stage condenser 12 and delivered to the liquid sulfur pool 17 to produce the liquid sulfur;

The process gas was passed sequentially into the primary catalytic converter 13, the second stage condenser 14, the secondary catalytic converter 15 and the third stage condenser 16 of the catalytic reaction unit. After subjecting to the Claus catalytic conversion, the elemental sulfur passed through the second stage condenser 14 and the third stage condenser 16 and entered the liquid sulfur pool 17; the reacted Claus tail gas was transported into the tail gas purification unit.

(b) The oxidized tail gas was subjected to hydrogenation reduction and the hydrogen sulfide in the reduction product obtained from the hydrogenation reduction was recovered in the hydrogenation purification unit.

The Claus tail gas was heated by a tail gas reheater 111 to 236° C. and entered the hydrogenation reactor 21, where the sulfur-containing compounds were subjected to hydrogenation and converted to hydrogen sulfide by the action of a hydrogenation catalyst in the hydrogenation reactor 21, the hydrogen sulfide was cooled by a hydrogenation tail gas cooler 22 and a quench tower 23, and entered an absorption tower 24 with an amine solution (high-efficiency desulfurizer with a model name KMKTS-15, purchased from Zibo Kaimeike Trade Co., Ltd.), the hydrogen sulfide in the tail gas was absorbed to produce the purified tail gas.

(c) The tail gas after the hydrogenation reduction was incinerated in an incineration unit.

The purified tail gas was introduced into an incineration unit (incinerator) 31 for incineration, producing the $SO_2$-containing flue gas, which was introduced into an adsorption unit.

(d) Contacting the $SO_2$-containing flue gas obtained from the incineration with an adsorbent in an adsorption unit to adsorb $SO_2$ The flue gas was subjected to a heat exchange with a flue gas heat exchanger 222 and its temperature was decreased to 145° C., the cooled flue gas entered a first absorption tower 41, which was in the adsorbed state. After the $SO_2$ in the flue gas was adsorbed, the flue gas was discharged via a chimney, and the $SO_2$ emission control target of the flue gas was 20 mg/m³. In the initial stage of operation, $SO_2$ was not detected in the purified flue gas. After an operation for 650 h, the $SO_2$ was present in the flue gas at a low concentration of 1 mg/m³. After continuous operation for 780 h, the concentration of $SO_2$ in the flue gas reached 8 mg/m³. Following the continuous operation for 900 h, the concentration of $SO_2$ in the flue gas reached 20 mg/m³. The first absorption tower 41 was switched off, and the second absorption tower 42 was switched on so as to adsorb the incineration tail gas. At the same time, the first absorption tower 41 was subjected to the thermal regeneration by introducing the hot nitrogen gas, the regeneration process produced a regeneration gas containing $SO_2$. The regeneration gas was introduced into the primary catalytic converter 13 and subjected to retreatment. The regeneration time was 100 h (relative to the sorbent with a volume of 20 m³). When the concentration of $SO_2$ in the flue gas exhausted from the second absorption tower 42 reached 20 mg/m³, the regenerated first absorption tower 41 was switched on so as to adsorb the regeneration gas. Finally, the $SO_2$ emission concentration in the sulfur recovery device can be controlled to be less than 20 mg/m³ by controlling the adsorption accuracy of 20 mg/m³, such that the requirements of reducing the concentration of $SO_2$ in the flue gas to less than 50 mg/m³ imposed by the most stringent environmental protection regulations at present was satisfied. Furthermore, the regeneration mode was simple, and the whole treatment process was continuous and clean.

Test Example 4

The desulfurization of acid gas was performed according to the same system and method as those of the Test example 3, except that the incinerator of the incineration unit was replaced with the catalytic incineration reactor, and the regeneration mode was water wash regeneration, as shown in FIG. 2, the water wash regeneration mode was as follows: the washing water was introduced into the first adsorption tower 41 for carrying out the adsorbent regeneration, which brought forth the regenerated dilute acid, the regenerated dilute acid was introduced into the thermal reaction furnace 11 and subjected to retreatment. The regeneration time was 140 h. The specific operating conditions for each step were shown in Table 6.

TABLE 6

| | Operating condition | Test example 3 | Test example 4 |
|---|---|---|---|
| Oxidation unit | Thermal reaction furnace | The temperature was 1,250° C. The residence time was 2 s | The temperature was 900° C. The residence time was 3 s |
| | First stage condenser | The outlet temperature was 162° C. | The outlet temperature was 180° C. |
| | The volume content of sulfur-containing compounds in the process gas at an outlet of the first stage condenser | $H_2S$: 7.56%, $SO_2$: 3.78%, organic sulfur: 0.5% | $H_2S$: 7.38%, $SO_2$: 3.61%, organic sulfur: 0.6% |
| | Primary catalytic converter | Catalyst: aluminium oxide-based catalyst (purchased from Shandong Qilu Keli Chemical Institute Co., Ltd., with a brand number LS-02) The gas volume hourly space velocity was 800 $h^{-1}$ The temperature was 306° C. | Catalyst: titanium oxide-based catalyst (purchased from Shandong Qilu Keli Chemical Institute Co., Ltd., with a brand number LS-981) The gas volume hourly space velocity was 600 $h^{-1}$ The temperature was 290° C. |
| | Second stage condenser | The outlet temperature was 153° C. | The outlet temperature was 130° C. |
| | Secondary catalytic converter | Catalyst: aluminium oxide-based catalyst (purchased from Shandong Qilu Keli Chemical Institute Co., Ltd., with a brand number LS-02) The gas volume hourly space velocity was 800 $h^{-1}$ The temperature was 246° C. | Catalyst: aluminium oxide-based catalyst (purchased from Shandong Qilu Keli Chemical Institute Co., Ltd., with a brand number LS-02) The gas volume hourly space velocity was 600 $h^{-1}$ The temperature was 220° C. |
| | Third stage condenser | The outlet temperature was 145° C. | The outlet temperature was 145° C. |
| | Volume content of the sulfur-containing compounds in the tail gas | $H_2S$: 1.28%, $SO_2$: 0.51%, organic sulfur: 0.05% | $H_2S$: 1.52%, $SO_2$: 0.75%, organic sulfur: 0.04% |
| Hydrogenation purification unit | Hydrogenation reactor | Catalyst: Co-Mo based tail gas hydrogenation catalyst (purchased from Shandong Qilu Keli Chemical Institute Co., Ltd., with a brand number LSH-02) The gas volume hourly space velocity was 500 $h^{-1}$ The temperature was 236° C. | Catalyst: Co-Mo based tail gas hydrogenation catalyst (purchased from Shandong Qilu Keli Chemical Institute Co., Ltd., with a brand number LS-951T) The gas volume hourly space velocity was 1,000 $h^{-1}$ The temperature was 350° C. |
| | Hydrogenation tail gas cooler | The outlet temperature was 145° C. | The outlet temperature was 155° C. |
| | Quench tower | The outlet temperature was 38° C. | The outlet temperature was 32° C. |
| | Absorption tower | Concentration of the amine solution was 38 wt. % The temperature was 38° C. | Concentration of the amine solution was 42 wt. % The temperature was 35° C. |
| | Volume content of the sulfur-containing compounds in the tail gas | $H_2S$: 82 ppm, COS: 16 ppm, no other sulfur-containing compound was detected | $H_2S$: 85 ppm, COS: 28 ppm, no other sulfur-containing compound was detected |
| Incineration unit | Incinerator | The temperature was 700° C., the residence time was 2.5 s | — |
| | Catalytic incineration reactor | — | Catalyst: a catalytic incineration catalyst containing iron and vanadium (purchased from Shandong Qilu Keli Chemical Institute Co., Ltd., with a brand number LS-941), the temperature was 300° C., the gas volume hourly space velocity was 800 $h^{-1}$ |
| | The $SO_2$ content in the generated flue gas | 256 mg/m³ | 305 mg/m³ |
| Adsorption unit | | Adsorbent: Example 1 The temperature was 150° C. The gas volume hourly space velocity was 2,000 $h^{-1}$ The concentration of $SO_2$ in flue gas reached 20 mg/m³ when the operation time was 900 h | Adsorbent: Example 1 The temperature was 100° C. The gas volume hourly space velocity was 1,500 $h^{-1}$ The concentration of $SO_2$ in flue gas reached 20 mg/m³ when the operation time was 820 h |
| Regeneration | Thermal regeneration | The gas volume hourly space velocity was 1,200 $h^{-1}$ The temperature was 200° C. | — |
| | Water wash regeneration | — | The liquid hourly space velocity (LHSV) was 1 $h^{-1}$, the temperature was 26° C. |

Test Example 5

The desulfurization of acid gas was performed according to the same system and method as those of the Test example 3, except that the temperature of the adsorption unit was 80° C. and the gas volume hourly space velocity was 1,000 h$^{-1}$. The concentration of $SO_2$ in the flue gas reached 20 mg/m$^3$ after an operation time of 720 h.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A composite material, comprising activated carbon, alkali metal oxides, silicon oxides, iron oxides, and rare earth element oxides, wherein the weight ratio between the activated carbon, iron oxides and rare earth element oxides is 100:(0.5-5):(1-10), and the composite material satisfies the following formula I:

$$\frac{M_1}{30(M_3 + M_4 + 3 \times M_5)} \leq M_2 \leq \frac{1.5 \times M_3}{M_4} \quad \text{formula I}$$

in formula I:
$M_1$ represents the weight content of activated carbon in the composite material;
$M_2$ represents the weight content of alkali metal oxides in the composite material;
$M_3$ represents the weight content of silicon oxides in the composite material;
$M_4$ represents the weight content of iron oxides in the composite material;
$M_5$ represents the weight content of oxides of rare earth elements other than cerium in the composite material.

2. The composite material of claim 1, wherein the pore volume of the pores having a pore size below 3 nm accounts for 80% or more of the total pore volume of the composite material.

3. The composite material of claim 1, wherein the pore volume of the pores having a pore size below 3 nm accounts for 80-88% of the total pore volume of the composite material.

4. The composite material of claim 1, wherein the pore volume of the pores having a pore size below 1 nm accounts for 5-10% of the total pore volume of the composite material; the pore volume of the pores having a pore size within a range of 1-2 nm accounts for 40-55% of the total pore volume; the pore volume of the pores having a pore size larger than 2 nm and equal to or less than 3 nm accounts for 25-35% of the total pore volume.

5. The composite material of claim 1, wherein a weight ratio between the activated carbon, alkali metal oxides, silicon oxides, iron oxides, and rare earth element oxides is 100:(0.2-3):(0.8-5):(0.5-5):(1-10).

6. The composite material of claim 1, wherein the alkali metal oxide is $K_2O$ and/or $Na_2O$, the silicon oxide is $SiO_2$, the iron oxide is $Fe_2O_3$, and the rare earth element oxide is $CeO_2$ and/or $La_2O_3$.

7. The composite material of claim 1, wherein the rare earth element oxides are $CeO_2$ and $La_2O_3$, and the weight ratio of $CeO_2$ and $La_2O_3$ is within a range of 1-3.

8. The composite material of claim 1, wherein the composite material has a specific surface area larger than or equal to 550 m$^2$/g, a pore volume larger than or equal to 0.35 ml/g, a saturated sulfur volume larger than or equal to 15%, and a sulfur breakthrough capacity larger than or equal to 12%.

9. The composite material of claim 1, wherein the composite material has a specific surface area within a range of 560-590 m$^2$/g, a pore volume within a range of 0.36-0.4 ml/g, a saturated sulfur volume within a range of 20-25%, and a sulfur breakthrough capacity within a range of 15.5-16%.

10. The composite material of claim 1, wherein the composite material does not contain a detectable amount of Y, Cu, Al, Ni, Mn, Co, Zn, Mg, V, Zr, Ti, or Mo.

11. A system with a desulfurization function, wherein the system comprises:
an oxidation unit for treating sulfur-containing gas and recovering sulfur;
a hydrogenation purification unit, which is connected with the oxidation unit for subjecting the oxidation tail gas from the oxidation unit to hydrogenation reduction and recovering hydrogen sulfide in the reduced product obtained from the hydrogenation reduction;
an incineration unit for incinerating the purified tail gas discharged from the hydrogenation purification unit;
an adsorption unit for adsorbing $SO_2$ from the $SO_2$-containing flue gas obtained by incineration, wherein the adsorbent used in the adsorption unit is the composite material of claim 1.

12. The system of claim 11, wherein the adsorption unit further comprises an inlet and an outlet of substance used for regeneration, for introducing the substance used for regeneration into the adsorption unit for regenerating the adsorbent, and the adsorption unit is further connected with the oxidation unit, such that the $SO_2$-containing regeneration gas obtained from regeneration is returned to the oxidation unit and subjected to retreatment.

13. A method for desulfurization, wherein the method comprises the following steps:
(a) oxidizing the sulfur-containing gas to be treated and recovering the sulfur;
(b) subjecting the oxidized tail gas to hydrogenation reduction and recovering hydrogen sulfide from the reduction product obtained from the hydrogenation reduction;
(c) incinerating the tail gas obtained after the hydrogenation reduction;
(d) contacting the incinerated $SO_2$-containing flue gas with a sorbent to adsorb $SO_2$, the sorbent is the composite material of claim 1.

14. The method of claim 13, wherein the conditions of the contacting in step (d) comprise a temperature within a range of 100-150° C. and a gas volume hourly space velocity within a range of 1,500-2,000 h$^{-1}$;
and/or, the method further comprises regenerating the sorbent, and returning the regenerated $SO_2$-containing regeneration gas to step (a) for subjecting to retreatment.

15. The composite material of claim 1, wherein a weight ratio between the activated carbon, alkali metal oxides, silicon oxides, iron oxides, and rare earth element oxides is 100:(0.5-2):(1-2.8):(1-2.2):(2-5).

* * * * *